United States Patent [19]

Veatch

[11] 3,989,216

[45] Nov. 2, 1976

[54] TRANSDUCER MOUNTING BRACKET

[76] Inventor: Don W. Veatch, P.O. Box 207, Longview, Tex. 75601

[22] Filed: Oct. 16, 1975

[21] Appl. No.: 623,090

[52] U.S. Cl. .................................. 248/278; 340/8 S
[51] Int. Cl.² ......................................... H04B 13/00
[58] Field of Search ........................ 248/278, 279, 4; 340/8 S; 240/61.6

[56] References Cited

UNITED STATES PATENTS

| | | | |
|---|---|---|---|
| 2,671,206 | 3/1954 | Krause | 340/8 S UX |
| 2,775,423 | 12/1956 | Strass | 248/180 |
| 2,837,727 | 6/1958 | Mayes | 340/8 S UX |
| 2,865,014 | 12/1958 | Malm | 340/8 S UX |
| 2,955,788 | 10/1960 | Bray | 248/4 |
| 3,212,056 | 10/1965 | Grieg | 340/8 S UX |
| 3,553,638 | 1/1971 | Sublett | 340/8 S X |
| 3,740,706 | 6/1973 | Joseph | 340/8 S |

FOREIGN PATENTS OR APPLICATIONS

| | | | |
|---|---|---|---|
| 99,208 | 11/1961 | Norway | 340/8 S |
| 180,506 | 8/1962 | Sweden | 340/8 S |

*Primary Examiner*—J. Franklin Foss
*Attorney, Agent, or Firm*—James C. Fails

[57] ABSTRACT

A bracket for mounting an acoustic transducer to a boat or the like to allow the transducer to be used as a depth sounder or as a scanning device. The bracket comprises a shaft; support means for coupling the shaft to a boat with the shaft located with its lower end in the water; a transducer supporting mount pivotally coupled to the lower end of the shaft for pivotal movement about an axis transverse to the shaft; means for rotating the shaft 360° about its axis; and means for pivoting the mount between different angular positions to allow vertical and generally horizontal signal transmission and reception.

8 Claims, 8 Drawing Figures

Fig. 1
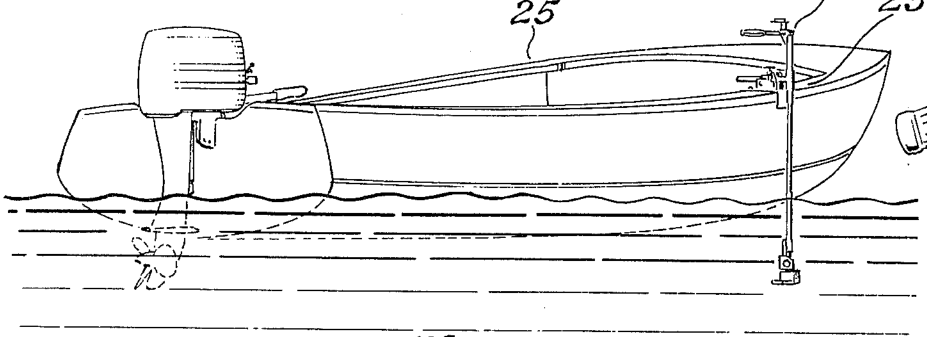
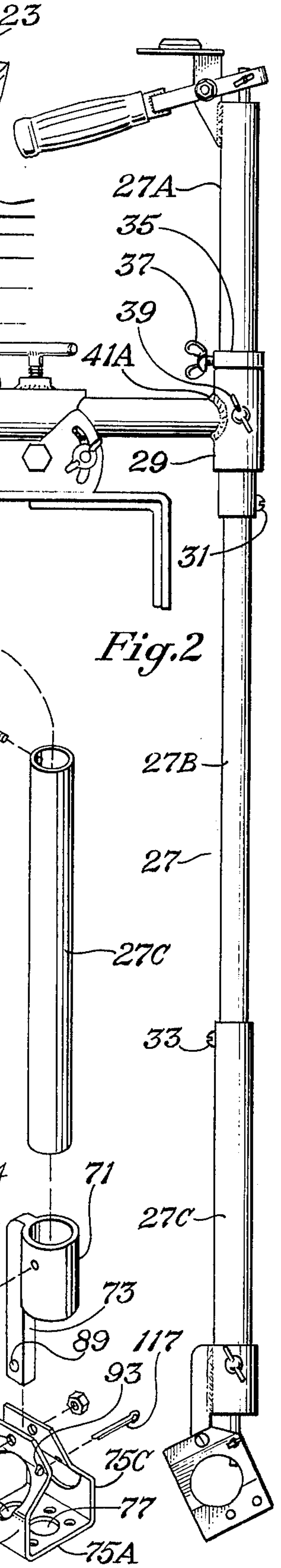
Fig. 2
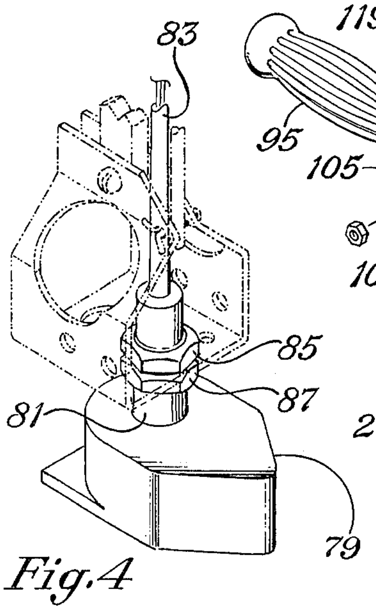
Fig. 4
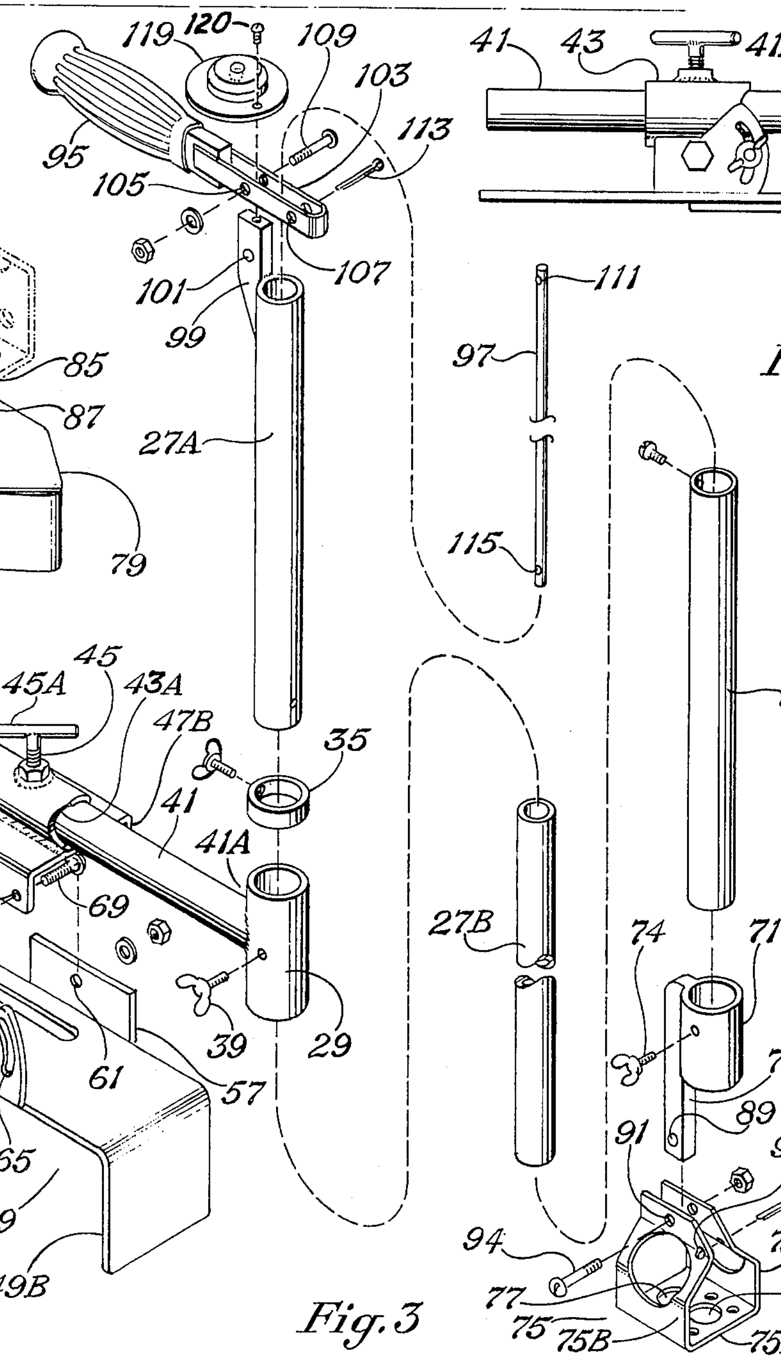
Fig. 3

TRANSDUCER MOUNTING BRACKET

Reference is made to disclosure document No. 17 received in the U.S. Pat. Office on Feb. 20, 1974 which is directed to a mechanical device for use in conjunction with electronic depth sounding equipment on a small water craft.

BACKGROUND OF THE INVENTION

This invention relates to a transducer mounting bracket for a boat and more particularly to a bracket for mounting an acoustic transducer to a boat for allowing the transducer to be used as a depth sounder or as a scanning device.

Currently electronic sonar systems are being used extensively by fishermen and boatmen. These systems include an acoustic sending and receiving transducer to be located in the water and monitoring or display instrumentation located in the boat. Various brackets currently are in use for mounting the transducer to the boat. The known brackets however, generally mount the transducer in a fixed position whereby the signal is sent generally downward. The known adjustable brackets require removal of the bracket from the water and manual manipulation into another fixed position.

SUMMARY OF THE INVENTION

It is an object of the present invention to provide a bracket for mounting an acoustic transducer to a boat or the like to allow the transducer to be used as a depth sounder, scanning device, depth probe, and navigation aid.

The bracket comprises an elongated shaft; means for coupling the shaft to a boat or the like with the shaft located with its lower end in the water; a transducer supporting mount pivotally coupled to the lower end of the shaft for pivotal movement above an axis transverse to the length of the shaft; means for rotating the shaft about its axis; and means for pivoting the mount and hence a transducer supported thereby between first and second angular positions. The mount when in said first angular position allows the transducer to transmit and receive signals in the direction of the axis of said shaft and when in said second angular position allows the transducer to transmit and receive signals in a direction transverse to the axis of said shaft.

In a further aspect the shaft is supported in a collar for 360° rotation therein. Support means is coupled to said collar and is adapted to be attached to a boat or the like to locate the collar above the water with the axis of the collar generally vertical. A lever is pivotally coupled to the top end of the shaft for angularly moving the shaft in the collar and for pivotal movement about a second axis generally transverse to the shaft. Also provided is a rod which has a top end pivotally coupled to the lever and a bottom end pivotally coupled to the mount for causing the transducer mount to pivot about its axis upon pivotal movement of the lever.

The support means for mounting the shaft to the boat comprises a base adapted to be coupled to the boat; a second shaft connected transversely to the first shaft and supported in a second collar for angular movement about its axis and means for pivotally coupling the second collar to the base for pivotal movement about an axis generally transverse to the second shaft to allow the first shaft to be moved to different angular positions relative to the base. A level is coupled to the top end of the first shaft.

BRIEF DESCRIPTION OF THE DRAWINGS

FIG. 1 illustrates the transducer mounting bracket attached to the gunwale of a boat with its lower end located in the water for supporting an acoustic transducer in the water;

FIG. 2 is a side view of the bracket of FIG. 1;

FIG. 3 is an exploded view of the bracket of FIG. 2;

FIG. 4 illustrates one type of transducer mounting base which may be coupled to the lower end of the bracket of the present invention;

Figure 5:
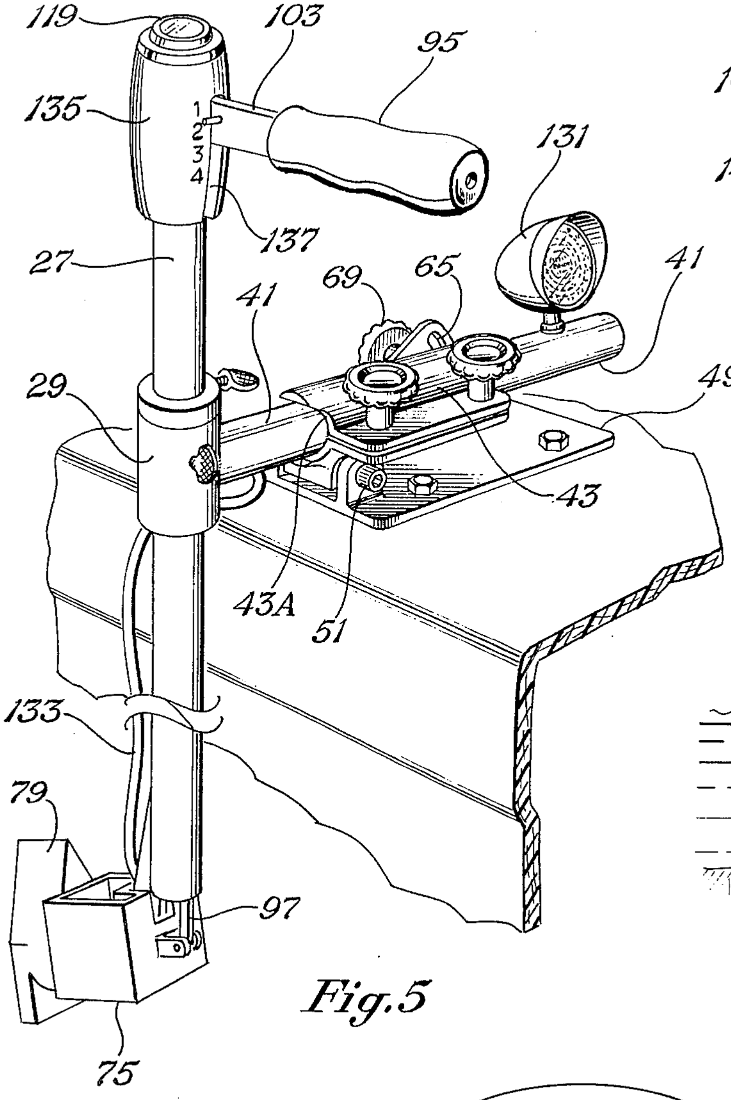
FIG. 5 illustrates a transducer mounting bracket which is similar to that of FIGS. 1–4 but which has a spring biased ball for engagement with a plurality of detents in the handle for positively holding the handle and hence the lower mount in a plurality of known positions. In addition the depth sounding electronic instrumentation is made a part of the bracket.

DETAILED DESCRIPTION OF THE INVENTION:

Referring now to FIG. 1, the bracket of the present invention is identified at 21. It is shown attached to the gunwale 23 of a boat 25 with its lower end located in the water for supporting an acoustic transducer in the water. As seen in FIGS. 2 and 3, the bracket 21 comprises an elongated, hollow, tubular shaft 27 supported in a collar 29 for 360° rotation or angular movement therein. The shaft 27 is formed from three tubular member 27A, 27B and 27C rigidly connected together by bolts 31 and 33. In this respect, bolt 31 is threaded through apertures formed through tubes 27A and 27B to connect these tubes together while bolt 33 is threaded through apertures formed through tubes 27C and 27B to connect these tubes together. The top tubular member 27A is fitted within collar 29 for 360° rotation therein whereby the shaft 27 may be rotated 360°. A sleeve 35 is fitted around tubular member 27A above the collar 29 and is secured to the tubular member 27A by way of a wing bolt 37 threaded through an aperture formed in sleeve 35 and into contact with tubular member 27A. The sleeve 35 and the bolt 31 limit axial movement of the shaft 27 within the collar 29. A second wing bolt 39 is threaded through an aperture formed in the collar 29 and into engagement with the shaft 27 to hold the shaft 27 in a desired angular position relative to the collar. For free rotation of the shaft 27 within the collar 29, the wing bolt 39 will be threaded outward so that it will not engage the shaft 27.

A second shaft 41 has an end 41A welded to the collar 29 at a 90° angle and is fitted within a second collar 43 for axial and angular movement rotation therein. A threaded member 45 having a T-shaped head 45A is threaded through an aperture formed in the collar 43 to engage the shaft 41 to hold the shaft in a desired angular position relative to the collar 43. The collar 43 is welded to a U-shaped member 47 which is pivotally coupled to a L-shaped base 49 by way of a bolt 51. The base 49 comprises an elongated portion 49A which is adapted to be fitted over the gunwale of a boat, and a transverse portion 49B which is adapted to engage the side of the boat. The base 49 may be attached to the gunwale by the use of small bolts (not shown) inserted through slots 53 formed in the base and through appropriate holes drilled through the gunwale. Although not shown, a pad is provided on the underside of the L-shaped base 49 for protecting the surface of the boat. Two tabs 55 and 57 are connected to the base portion 49A and have aligned apertures 59 and 61 formed therethrough respectively. Two aligned apertures 63 (only one of which is shown) are formed through the side portions 47A and 47B respectively of the U-shaped member 47. The side portions 47A and 47B of the U-shaped member are adapted to be fitted within the tabs 55 and 57 with the apertures 59, 63, and 61 in alignment with each other for receiving the bolt 51 for pivotally coupling the U-shaped member 47 and hence the collar 43 to the top of the base. An arcuate slot 65 is formed in the tab 55 and a second aperture 67 formed in the side member 47A for receiving a bolt 69 for tightening the U-shaped member 47 and hence the collar 43 in a desired angular position relative to the base 49. Having attached the base 49 to the gunwale, the shaft 27 may be located out from the side of the boat and in a vertical position with its lower end in the water by pulling the shaft 41 outward to the desired position and adjusting the angular position of the shaft 41 relative to the collar 43 and the angular position of the U-shaped plate 47 relative to the base 49. Having made the proper adjustment, the threaded member 45 and the bolt 69 are tightened to fix the axis of the collar 29 and hence the shaft 27 in a vertical position.

Secured to the lower end of the tubular member 27C and hence to the shaft 27 is a sleeve 71 having a rod 73 of rectangular cross-section attached thereto and extending therebelow. A wing bolt 74 is threaded through apertures formed in the sleeve 71 and through the member 27C for attaching the sleeve 73 to the shaft. Pivotally coupled to the rod 73 and hence to the lower end of the shaft 27 is a mount 75 for supporting an acoustic transducer. The mount 75 has a flat bottom 75A with two sides 75B and 75C extending therefrom. A plurality of apertures 77 are formed through the bottom 75A to allow different types of transducer base mounts to be attached thereto. One type of transducer base mount is illustrated at 79 in FIG. 4. An acoustic transducer (not shown) is attached to the bottom side of the base mount 79. The base mount 79 has a cylindrical member 81 extending from the top side through which extend electrical leads 83 coupled to the transducer. The leads will extend to the display or monitoring instrumentation located in the boat. The cylinder 81 may be inserted upward through one of the apertures 77 into the space formed between the two sides 75B and 75C. Two nuts 85 and 87 are adapted to be threaded to the cylinder 81 on opposite sides of the bottom 75A for securely fastening the transducer base mount 79 to the mount 75.

An aperture 89 is formed through the rod 73 and two pairs of apertures 91 and 93 are formed through the top ends of the side members 75B and 75C of the mount 75. The rod 73 is adapted to be fitted between the top ends of the side members 75B and 75C with its aperture 89 in alignment with the apertures 91 for receiving a bolt 94 for pivotally coupling the mount 75 to the lower end of the shaft 27. The mount 75 can be pivoted from a first position wherein the plane of its bottom 75A is perpendicular to the axis of the shaft 27 to a second position wherein the plane of its bottom 75A is nearly parallel with the axis of the shaft 27. The angle through which the plane of the bottom 75A may be pivoted is optional depending upon the design characteristics of the electronic equipment to be used. In one embodiment the angle may be about 90°. When the bottom of the mount 75 is perpendicular to the axis of the shaft 27, the face of the transducer attached to the bottom of the base mount 89 will face downward whereby the transmission and reception of acoustic signals will be predominantly in the direction of the axis of the shaft 27 and hence predominantly vertical. In this position, depth sounding may be carried out. In the second position of the mount 75 wherein its bottom is nearly parallel with the axis of the shaft 27, the face of the transducer attached to the bottom of the base mount 79 will face in a direction transverse to the axis of the shaft 27 whereby the transmission and reception of acoustic signals will be predominantly in a direction transverse to the axis of the shaft 27 and hence nearly horizontal. In this position and in other positions between the first and second positions, scanning may be carried out.

The mount 75 may be moved between its first and second positions and to any angle in between by the use of a handle or lever 95 and a rod 97 extending through the shaft 27. The handle 95 is pivotally coupled to the top of the shaft 27 and to the top of the rod 97 while the lower end of the rod 97 is pivotally coupled to the mount 75. As illustrated, a rod 99, rectangular in cross-section, is attached to the top of the tubular member 27A and hence to the top of the shaft 27 and has an aperture 101 formed therethrough. The handle 95 comprises a U-shaped portion 103 which has a pair of apertures 105 and 107 formed therethrough. The rod 99 is adapted to be fitted within the U-shaped portion 103 with its aperture 101 in alignment with apertures 105 for receiving a bolt 109 for pivotally coupling the handle to the shaft 27. The top of the rod 97 has an aperture 111 formed therethrough and is adapted to be fitted within the U-shaped portion of the handle 95 with its aperture 111 in alignment with the apertures 107 for receiving a cotter pin 113 for pivotally coupling the rod 97 to the handle portion 103. The lower end of the rod has an aperture 115 formed therethrough and is adapted to be fitted between the top ends of the side members 75B and 75C with its aperture 115 in alignment with apertures 93 for receiving a second cotter pin 117 for pivotally coupling the bottom end of the rod 97 to the mount 75. Bolts 94 and 109 and cotter pins 113 and 115 thus define a parallelogram. Since bolts 94 and 109 are stationary with respect to the shaft 27 and hence with respect to the bracket, movement of the handle 95 upward or downward will pivot and hold the mount 75 in any desired position between its first and second angular positions and at all angles therebetween.

Thus it can be understood that the bracket may be readily attached to a boat and the shaft 27 located to the side of the boat and positioned vertically by adjustment of the shaft 41 and the plate 47 and by tightening member 45 and bolt 69. Attached to the rod 101 and hence to the shaft 27 is an eye-level 119 to aid in locating the shaft 27 in a vertical position. A bolt 120 is employed to attach the level 119 to the top of the rod 101. If it is desired to the use the transducer for depth sounding, the handle 95 will be locating in a horizontal position to locate the face of the transducer downward. For scanning purposes, the handle 95 will pivoted downward to pivot the bottom of the mount 75 and hence the face of the transducer to a selected angular position other than downward. In this position, the handle 95 may be rotated 360° to rotate the shaft 27 and hence the transducer 360° to allow scanning to be carried out over a 360° arc.

Thus it can be understood that the bracket of the present invention allows the operator of the sonar system to select the angle and direction of acoustic signal transmission by use of the hand operated lever for rotating the shaft 360° and for pivoting the face of the transducer to the desired transmission and reception angle. By using the several optional positions of the control lever and rotating the shaft 27, 360° while in each of the positions, the operator may "sound out" or scan an area beneath and surrounding the location of his boat. The size of the area scanned is dependant upon the range of the electronic equipment in use and the desires of the operator. The depth of the water below and surrounding the boat may be measured with the system as a navigational aid or the system may be used for scanning purposes to find fish habitat or to find fish. In this respect the unit may be used to detect under water irregularities such as stumps, tree tops, under water islands, rocks, etc. Success in locating fish is greatly enhanced by the ability of the operator of the present invention to send his signal in a nearly "horizontal" plane. The echo is therefore stronger since the size of the target from this angle is substantially larger than the downward signal strikes. That is, the side profile of fish is larger than the top profile. Additionally, fish tend to suspend in horizontal layers, thereby affording more targets to the effective cone of sound than the "down only" signal. When used as a navigational aid, the operator may preselect the water depth which he desires to navigate by setting the handle in the desired position and rotating the acoustic signal cone back and forth while the boat is moving to obtain a continuous monitor of depths and obstructions ahead. This capability is limited to relatively slow speed operation of the boat due to inherent design characteristics of the bracket. By directing the sonar signal in the direction of travel, and securing it there, signals from any obstruction that may occur in the path of the boat such as shallow water, stumps, rocks and such will warn the operator of such hazards. Some of the electronic sounders give off audible signals (such as a beep) in such instances, thereby providing audible as well as visual warning to potential hazards. For high speed operations, the bracket may be moved and supported on the gunwale by pivoting the shaft 27 to a horizontal position and pulling the shaft 41 inward to the collar 43. Collar 43 has a concave face 43A turned toward collar 29 to receive and secure the rod 27 in a predetermined horizontal attitude and secures it there while in transit, reducing the tendency to oscillate. The present bracket thus has other advantages over known brackets which require unscrewing clamps and complete removal of the bracket from the gunwale in order to clear the edge of the gunwale. If desired a compass may be attached to the top of the shaft 27 as a further navigational aid.

Although in the preferred embodiment of the bracket, the shaft 27 and the mount 75 are rotated and pivoted manually by the handle or lever 95 it is to be understood that these functions may be carried out by suitable foot operated controls attached with cables or automatically with DC electric motors.

Although the shaft 27 was described as formed from three separate tubes 27A–27C, it is to be understood that the shaft 27 may be formed as a single tubular member. In addition although the control rod 97 is shown located within the tubular shaft 27, it is to be understood that it could be located to the side thereof. In one embodiment, the shaft 27 has a length of about 3½ feet although it is to be understood that the shaft 27 may have different lengths.

Referring now to FIG. 5, the bracket is essentially the same as that as FIGS. 1–4 except that the shaft 27 is a single tubular member and the depth sounder electronic instrumentation 131 is mounted on the shaft 41. Leads 133 extend from the transducer to the instrumentation 131 through the shaft 41.

In addition a housing 135 is coupled to the top of the shaft 27 and has a slot 137 to allow the handle to move upward or downward within the limits of the slot. The handle 95 has a solid bar shaped member 103 rather than a U-shaped member as shown in FIG. 3. The bar shaped member 103 is pivotally coupled to the shaft 27 and to the rod 97 whereby pivotal movement of the handle causes the rod 97 to move the lower mount 75 through different angles as described previously in connection with FIGS. 1–4.

Figure 6:
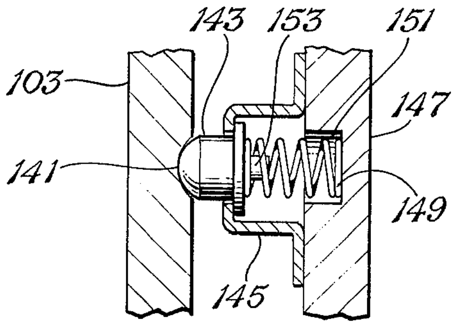
FIG. 6 illustrates an arrangement for holding the handle in a plurality of selected positions.
Figure 7:
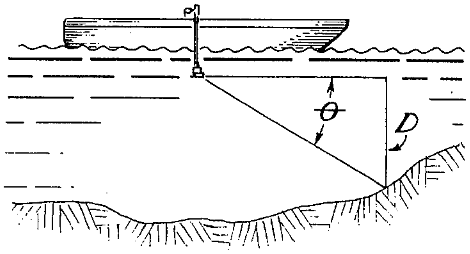
FIG. 7 illustrates the manner in which depth probing may be carried out.
Figure 8:
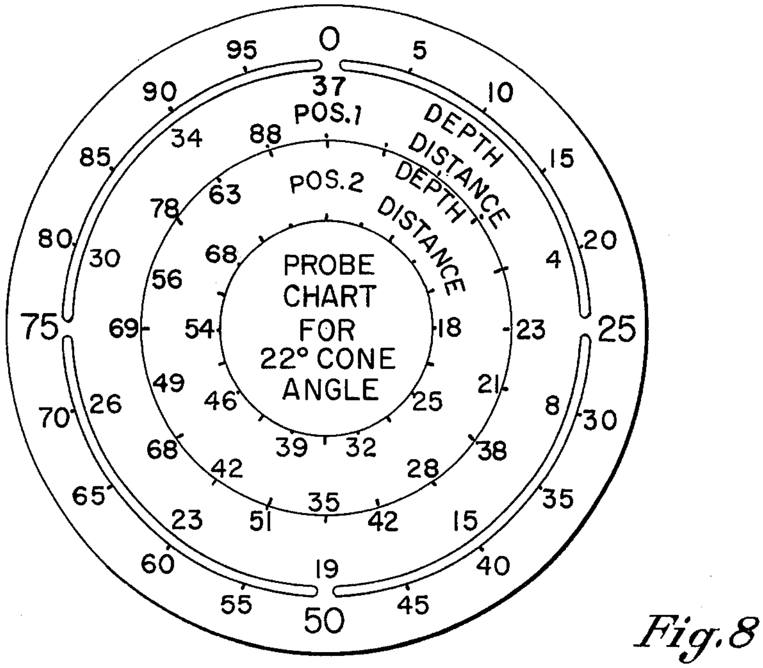
FIG. 8 is a vinyl decal that may be attached to the face of a scope.

Referring to FIG. 6, there is illustrated a detent of depression 141 formed in the handle bar 103 and a spring biased ball or knob 143 supported in a bracket 145 which is attached to a wall 147 of the housing 135. A spring 149 is seated in an aperture 151 formed in the wall 147 and has its opposite end seated against the knob 143 around an inner extension 153. The knob 143 may be moved inward but is biased outward by the spring 149. Although not shown, a plurality of detents 141 will be formed in an arc in the handle bar 103 whereby the handle 95 may be moved to position the knob 143 in any one of the detents desired. In one embodiment, four detents may be employed. When the ball 143 is in a given detent, the handle will be positively held in a given position, however, the edges of the detents are smooth enough to allow the ball 143 to be moved out of the detent when pressure is applied to the handle. When the handle is moved to position the knob 143 in a given detent indicated by the four numbers in FIG. 5, the lower mount 75 and hence the transducer will be located in a known and predetermined angle with respect to the shaft 27. The detent locations are dictated by the various sonar cone angles being used by the depth finder manufacturers. Location of these detents allow for known angles to be used in the computation of depths at substantial distances from the instrument. For example referring to FIG. 7, if the handle is positioned to locate the knob 143 in a given detent than the corresponding angle $\theta$ will be known from prior calibrations. In order to determine the depth D as illustrated in FIG. 7, the eye level 119 is employed to locate the shaft 27 in a vertical position after which it is secured in place. Operation of the sonar equipment then can be carried out to obtain the two way travel time between the transducer and the bottom of the water. This time along with the known angle $\theta$ may be used to calculate the distance D. For a given cone angle the distance can be precalculated for different angles $\theta$ and converted to the data shown on the decal of FIG. 8 which may then be attached to the face of the scope to allow the depth to be read off of the decal for each of the positions for which the handle may be located. The decal of FIG. 8 is precalculated for only the first and second positions of the handle of FIG. 5 for a given cone angle. For different cone angles depending upon the instrumentation employed, different decals may be used.

A complete survey of the area underneath and surrounding the instrument may be conducted by locating the handle alternately in each detent stop and rotating the entire instrument. The effect is similar to "peeling away a potato" in layers, generally avoiding overlapping.

Although the detents 141 are formed in the handle and the bolt 143 is mounted to the wall 147 it is to be understood that these parts may be reversed in position.

What is claimed is:

1. A bracket for mounting an acoustic transducer to a boat or the like, comprising:

shaft means, means for coupling said shaft means to a boat or the like with the shaft means located with its lower end in the water, said means for coupling said shaft means to said boat including structure for allowing universal pivotal movement of said shaft such that substantially vertical positioning of said shaft can be effected regardless of the attitude of said boat and such that reflections of acoustic energy from said acoustic transducer can be interpreted correctly;

a transducer support mount pivotally coupled to the lower end of said shaft means for pivotal movement about an axis transverse to the longitudinal axis of said shaft means, means for rotating said shaft means about its said longitudinal axis, and means for pivoting said mount and hence a transducer when supported by said mount between first and second angular positions, said mount when in said first angular position allowing the transducer to transmit and receive signals generally in the direction of the axis of said shaft means for measuring distance vertically to a reflecting object, as for measuring water depth, said mount in second position allowing the transducer to transmit and receive signals in a direction generally transverse to the longitudinal axis of said shaft means.

2. A bracket for mounting an acoustic transducer to a boat or the like comprising:

first collar means, support means coupled to said collar means and adapted to be attached to a boat or the like to locate said collar means above the water with the axis of said collar means generally vertical, first shaft means extending through said collar means and supported for angular movement about its axis within said collar means, a mount having a lower end for supporting a transducer in the water, said mount being pivotally coupled to the lower end of said shaft means for pivotal movement about a first axis generally transverse to the length of said shaft means, lever means coupled to the top end of said shaft means for angularly moving said shaft means about its axis within said collar means, said lever means being pivotally coupled to the top ends of said shaft means for pivotal movement about a second axis generally transverse to the length of said shaft means, and rod means having a top end pivotally coupled to said lever means and a bottom end pivotally coupled to said mount for causing said mount to pivot about said first axis upon pivotal movement of said lever means about said second axis;

said support means comprising:

i. base means adapted to be coupled to a boat or the like, ii. second collar means pivotally coupled to said base means so as to allow movement in at least a first plane, and iii. second shaft means supported for angular movement about its axis within said second collar means and having an end connected to said first collar means for positioning said first collar means and hence said shaft means in different angular positions in other said planes relative to the axis of said second shaft means such that, by selective movement in said plurality of planes, said shaft means can be emplaced in a substantially vertical position regardless of the attitude of a boat on which it is supported.

3. The bracket of claim 2 comprising:

means for pivotally coupling said second collar means to said base means for pivotal movement about an axis generally transverse to said second shaft means such that said second shaft means may be moved to different angular positions relative to said base means, and holding means for holding a respective position in which said means for pivotally coupling said collar means is placed, such that said shaft means can be emplaced in and held in its substantially vertical position regardless of the attitude of said boat and is substantially universally pivotal through the combined pivotal motions allowed by said second collar means and said means for pivotally coupling said collar means to said base means.

4. The bracket of claim 3 comprising:

a level coupled to the top end of said first shaft means to aid in locating said first shaft means in a vertical position such that, in coaction with said second collar means, said second shaft means and said means for pivotally coupling said second collar means to said base means, said first shaft means can be pivoted in a plurality of planes to obtain its vertical position and said level brought into equivalent respective position regardless of the attitude of said boat.

5. The bracket of claim 3 wherein:

said first shaft means is supported to be angularly moved 360° about its axis within said first collar means, said top end of said rod means is pivotally coupled to said lever means by way of a third pivot axis generally transverse to said first shaft means, said bottom end of said rod means is pivotally coupled to said mount by way of a fourth pivot axis generally transverse to said first shaft means, said first, second, third, and fourth pivot axes are generally parallel with each other and define a parallelogram and wherein said bracket also comprises:

a level coupled to the top end of said first shaft means to aid in locating said first shaft means in a vertical position, manually adjustable means on said second collar means and said means for pivotally coupling said second collar means for bringing said first shaft means into its vertical position regardless of the attitude of said boat such that said level can be brought to indicate said substantially vertical position regardless of the attitude of said boat.

6. The bracket of claim 10 comprising:

means for positively holding said lever means and hence said mount in a plurality of known angular positions relative to said shaft means.

7. The bracket of claim 1 wherein said structure comprises first and second means for allowing pivotal movement, respectively, about respective axes that are substantially perpendicular to each other such that said universal pivotal movement can be effected.

8. The bracket of claim 5 wherein said means for positively holding said lever means in said plurality of angular positions includes pre-positioned means in at least three predetermined positions having predetermined respective angles for said acoustic transducer and wherein there is provied a probe chart for respective transducer that is calibrated for each of said plurality of three positions so as to give depth and distance to reflections noted.

* * * * *

UNITED STATES PATENT OFFICE

CERTIFICATE OF CORRECTION

Patent No. 3,989,216 Dated November 2, 1976

Inventor(s) Don W. Veatch

It is certified that error appears in the above-identified patent and that said Letters Patent are hereby corrected as shown below:

Claim 6, column 9, line 8, "10" is changed to --5--.

Signed and Sealed this

*Twenty-ninth* Day of *November 1977*

[SEAL]

*Attest:*

RUTH C. MASON
*Attesting Officer*

LUTRELLE F. PARKER
*Acting Commissioner of Patents and Trademarks*